Oct. 10, 1961   G. L. GERBETH   3,003,538
RIM
Filed May 22, 1959

INVENTOR.
GERHART L. GERBETH
BY
*J. B. Holden*
ATTORNEY ically available and the description hereof is only general in nature to illustrate the invention. It will be apparent that the invention would be applicable to other rim types also.

3,003,538
RIM

Gerhart Lothar Gerbeth, Akron, Ohio, assignor to The Goodyear Tire & Rubber Company, Akron, Ohio, a corporation of Ohio
Filed May 22, 1959, Ser. No. 815,080
6 Claims. (Cl. 152—405)

This invention relates to a rim and more particularly to a rim driver to provide a positive means to prevent slipping between the bead seat ring and rim base due to the torque encountered in the vehicle operation.

Modern vehicles, particularly those referred to as earth mover or off-the-road equipment, have been increased in size and capacity to the point that some of the previous structural elements are no longer entirely suitable for this larger equipment. The usual rim structures used on this equipment includes on the mounting edge an endless separate bead seat ring that telescopes over the rim base with the tire bead wedged thereon. As a result, if slippage between the bead seat ring and base occurs, not only is the operation of the vehicle unsatisfactory but the tire itself and bead may be severely distorted and in many instances damaged. In addition, the sealing element on a rim for tubeless tires would be destroyed causing the tire to become flat. Such failures not only involve substantial expense in direct costs but also great amounts of down time for such equipment.

Due to the tremendous capacities and the resulting power requirements, some difficulty has been encountered in transmitting the driving power from the wheel and rim base to the tire because of slippage between the bead seat ring and rim base. In many rim structures, no positive interlock therebetween is provided and in other structures, the driver forming the interlock is not sufficient to withstand the tremendous torque loads to which it may be subjected.

A rim driver must be rugged in construction yet easy to install and remove even after having been in place for long periods of time. As a result close fitting and accurately machined parts usually will be difficult to assemble and disassemble unless sealed against the effects of corrosion, debris, etc. encountered in service. This is impractical in most rim constructions. It is therefore an object of this invention to provide a simple, positive rim driver.

Another object of the invention is to provide a rim driver that is of rugged construction yet easily assembled and disassembled.

A further object of the invention is to provide a rim driver that provides a positive interlock between the rim base and bead seat ring of a multiple piece rim.

A still further object of the invention is to provide a rim driver that will withstand the tremendous loads to which the present day vehicles are subjected.

Other objects of this invention will appear hereinafter as the description thereof proceeds, the novel features, arrangements and combinations being clearly pointed out in the claims hereunto appended.

Figure 1:
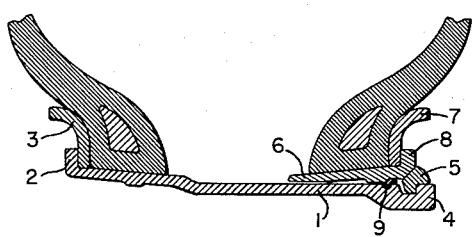
FIG. 1 is a cross sectional view of a typical tubeless tire and rim assembly.
Figure 2:
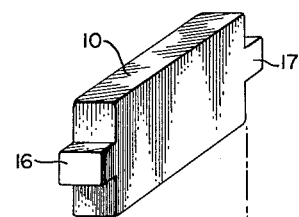
FIG. 2 is a perspective illustrating the assembly of rim and rim driver.
Figure 2:
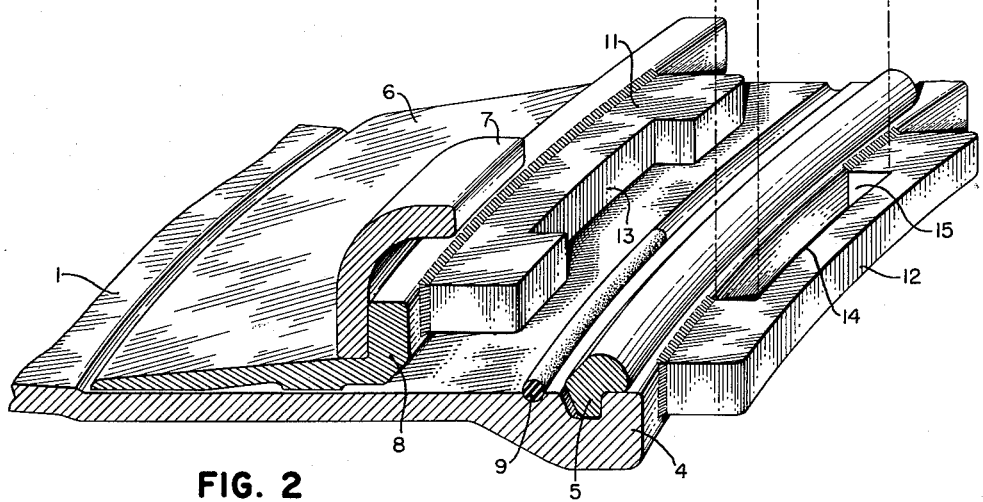
Figure 3:
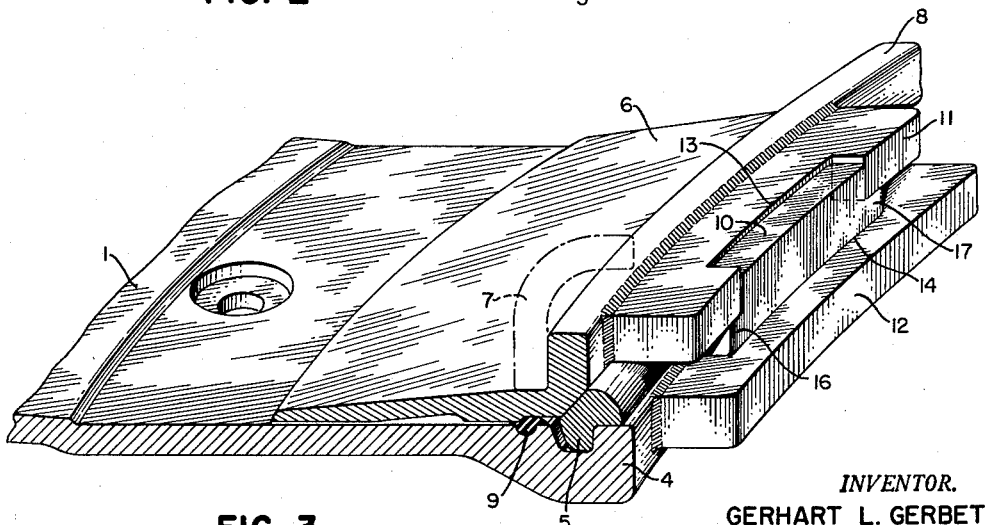
FIG. 3 is a perspective showing the rim and rim driver in the assembled position.

In FIG. 1 a typical multiple-piece rim assembly for large off-the-road or earth mover tubeless tires is shown in which the numeral 1 represents the rim base. Along one edge of the base 1 is an up-turned portion 2 against which the bead retaining flange 3 lies when the rim is assembled. Along the opposite edge of the base 1 is a gutter edge portion 4 into which a split lock ring 5 is mounted to engage the endless bead seat ring 6 which telescopes over the rim base 1. A rim flange 7 engages the outwardly flanged portion 8 of the bead seat ring 6. Between the bead seat ring 6 and the base 1, an O-ring 9 is located which, when the rim is in the assembled position, is distorted under axial and radial stresses to seal the passageways between the rim parts through which the air would escape. The particular rim construction illustrated is commercially available and the description hereof is only general in nature to illustrate the invention. It will be apparent that the invention would be applicable to other rim types also.

In order to prevent slipping between the bead seat ring 6 and the rim base 1 when the tire and rim is subjected to torque, a driver 10 is inserted in a pocket formed between the member 11 attached for example by welding, to the outer periphery of the bead seat ring 6 and the member 12 attached for example by welding, to the outer periphery of the gutter edge 4 of the rim base 1. The member 11 has an axially outwardly open notch 13 along the edge thereof and member 12 includes a notch 14, the open side of which abuts the edge of the rim base to form an enclosed opening 15. When the bead seat ring and rim base are in the assembled position the notch 13 and opening 15 are aligned and cooperate to form the pocket to receive the driver 10. The driver 10 as shown has projecting ears 16 and 17 on opposite ends thereof to prevent the driver 10 from passing through the opening 15 between the member 12 and the rim base 1. The torque load between the rim base 1 and the bead seat ring 6 is resisted by shear stresses along the length of the driver 10.

To assemble the rim, the tire is placed over the rim base and then the bead seat ring 6 and rim flange 7 are placed over the rim base 1 and moved axially toward the other bead of the tire a sufficient distance to permit the sealing ring 9 and split lock ring 5 to be placed in position. In assembling the bead seat ring 6 onto the rim base 1, the notch 13 in member 11 is circumferentially aligned with the notch 14 in member 12. The driver 10 is then placed in the opening 15 in member 12. Air pressure is then introduced into the cavity formed by the rim and tire through a valve (not shown) in the usual manner to inflate the tire which causes the beads to move axially outwardly against the flanges 7 and 3 and, consequently, move the bead seat ring 6 axially outwardly over the sealing element 9 to distort it and, as the ring 6 moves into engagement with the locking ring 5, the air seal is completed. This causes the notch 13 in the member 11 to straddle the upper portion of driver 10 to key the rim base 1 and bead seat ring 6 together. To disassemble the rim, the tire is deflated and the bead seat ring 6 is moved axially inwardly sufficiently to permit the driver 10 to be lifted out of the opening in member 12. Then the remaining rim parts are disassembled in accordance with the usual procedures.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A multiple-piece rim for mounting a tire thereon including a generally cylindrical endless rim base, a removable endless bead seat ring encircling said rim base, a transversely split locking ring engaging said base and said bead seat ring to maintain the base and bead seat ring in the assembled position when a tire is mounted on said rim and means to prevent relative circumferential movement between said base and said bead seat ring when said tire and rim are in use on a vehicle, said means comprising a first member extending from the axial outer edge of said base and having an opening therethrough with the edge of the rim base forming the axial inner side of the opening, a second member extending from the axial outer edge of said bead seat ring and having a notch along the axial outer edge thereof, the opening in said first member and the notch in said second member being super-posed and aligned when the rim is in the assembled position to form a driver pocket therebetween, and an unattached driver member of a size to fit loosely in said pocket positioned therein to key said base and bead seat ring in fixed relation with respect to each other to prevent relative circumferential movement between said base and said bead seat ring when subjected to driving torque, the opening in said first member preventing axial displacement of the driver member.

2. A multiple-piece rim for mounting a tire thereon including a generally cylindrical endless rim base, a removable endless bead seat ring encircling said rim base, a transversely split locking ring engaging said base and said bead seat ring to maintain the base and bead seat ring in the assembled position when a tire is mounted on said rim and means to prevent relative circumferential movement between said base and said bead seat ring when said tire and rim are in use on a vehicle, said means comprising a first member extending from the axial outer edge of said base and having an opening therethrough with the edge of the rim base forming the axial inner side of the opening, a second member extending from the axial outer edge of said bead seat ring and having a notch of a configuration similar to that of the opening in the first member and open along the axial outer edge thereof, the opening in said first member and the notch in said second member being super-posed and aligned when the rim is in the assembled position to form a driver pocket therebetween, and an unattached driver member of a size to fit loosely in said pocket positioned therein to key said base and bead seat ring in fixed relation with respect to each other to prevent relative circumferential movement between said base and said bead seat ring when subjected to driving torque, the opening in said first member preventing axial displacement of the driver member.

3. A multiple-piece rim for mounting a tire thereon including a generally cylindrical endless rim base, a removable endless bead seat ring encircling said rim base, a transversely split locking ring engaging said base and said bead seat ring to maintain the base and bead seat ring in the assembled position when a tire is mounted on said rim and means to prevent relative circumferential movement between said base and said bead seat ring when said tire and rim are in use on a vehicle, said means comprising a first member extending from the axial outer edge of said base and having an opening therethrough with the edge of the rim base forming the axial inner side of the opening, a second member extending from the axial outer edge of said bead seat ring and having a notch of a configuration similar to that of the opening in the first member and open along the axial outer edge thereof, the opening in said first member and the notch in said second member being super-posed and aligned when the rim is in the assembled position to form a driver pocket therebetween, an unattached driver member of a size to fit loosely in said pocket positioned therein to key said base and bead seat ring in fixed relation with respect to each other to prevent relative circumferential movement between said base and said bead seat ring when subjected to driving torque, and means on said driver member extending from the opposite ends thereof to position said driver member in the opening of said first member, the opening in said first member preventing axial displacement of the driver member.

4. Means for preventing relative circumferential movement between the rim base and bead seat ring of a multiple-piece rim when said rim is in the assembled position comprising a first U-shaped member having the ends of the legs of the U attached to the edge of said rim base to form an opening therethrough, a second member attached to the bead seat ring having an axially outwardly open notch along the edge thereof, said opening in the first member and notch in said second member being substantially coextensive when super-posed and aligned in the assembled position of the rim base and bead seat ring to provide a pocket, and a key of a size to loosely fit in said pocket positioned therein to engage simultaneously the opening and notch to prevent relative circumferential movement between said base and bead seat ring when subjected to driving torque.

5. Means for preventing relative circumferential movement between the rim base and bead seat ring of a multiple-piece rim when said rim is in the assembled position comprising a first U-shaped member having the ends of the legs of the U attached to the edge of said rim base to form an opening therethrough, a second member having an axially outwardly open notch along the edge thereof, said opening in the first member and notch in said second member being substantially coextensive when super-posed and aligned in the assembled position of the rim base and bead seat ring to provide a pocket, and means inserted in said pocket to engage simultaneously the opening and notch to prevent relative circumferential movement between said base and bead seat ring when subjected to driving torque.

6. Means for preventing relative circumferential movement between the rim base and bead seat ring of a multiple-piece rim when said rim is in the assembled position comprising a first U-shaped member having the ends of the legs of the U attached to the edge of said rim base to form an opening therethrough, a second member attached to the bead seat ring having an axially outwardly open notch along the edge thereof, said opening in the first member and notch in said second member being substantially co-extensive when super-posed and aligned in the assembled position of the rim base and bead seat ring to provide a pocket, a key of a size to loosely fit in said pocket positioned therein to engage simultaneously the opening and notch to prevent relative circumferential movement between said base and bead seat ring when subjected to driving torque, and means on said key to maintain the key in position in said opening in the first member.

References Cited in the file of this patent

UNITED STATES PATENTS

| | | |
|---|---|---|
| 880,332 | Scott | Feb. 25, 1908 |
| 1,409,005 | Jobski | Mar. 7, 1922 |
| 2,900,006 | Lafaye | Aug. 18, 1959 |

FOREIGN PATENTS

| | | |
|---|---|---|
| 578,698 | Germany | June 17, 1933 |
| 1,084,491 | France | July 7, 1954 |